(12) United States Patent
Wilson

(10) Patent No.: US 7,003,138 B2
(45) Date of Patent: Feb. 21, 2006

(54) SYSTEM AND METHOD FOR GEOGRAPHICALLY REFERENCING AN IMPROVEMENT IMAGE

(75) Inventor: Blake Wilson, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 662 days.

(21) Appl. No.: 09/972,167

(22) Filed: Oct. 5, 2001

(65) Prior Publication Data

US 2003/0068071 A1   Apr. 10, 2003

(51) Int. Cl.
G06K 9/00 (2006.01)
G06K 9/32 (2006.01)
G06K 9/36 (2006.01)

(52) U.S. Cl. ............... 382/113; 382/287; 382/289; 382/291; 382/294; 382/295; 382/296; 382/298

(58) Field of Classification Search ............... 382/113, 382/287, 289–299, 286; 702/5
See application file for complete search history.

(56) References Cited

U.S. PATENT DOCUMENTS

| | | | |
|---|---|---|---|
| 3,748,644 A * | 7/1973 | Tisdale | 382/201 |
| 4,220,994 A * | 9/1980 | Hendrickson | 701/217 |
| 4,491,724 A * | 1/1985 | Murray | 235/88 N |
| 5,414,462 A * | 5/1995 | Veatch | 348/135 |
| 5,422,989 A | 6/1995 | Bell et al. | |
| 6,266,452 B1 * | 7/2001 | McGuire | 382/294 |

FOREIGN PATENT DOCUMENTS

| | | |
|---|---|---|
| WO | WO 8707013 A | 11/1987 |
| WO | WO 9956082 A | 11/1999 |
| WO | WO 0173690 A | 10/2001 |

* cited by examiner

*Primary Examiner*—Jingge Wu
*Assistant Examiner*—Anthony Mackowey
(74) *Attorney, Agent, or Firm*—Andrew A. Abeyta

(57) ABSTRACT

The instant invention is a system and method for converting improvement images to geographically referenced chart symbols and for combining improvement images with other geographically referenced information to create composite images. The instant invention provides for marking specific reference points on the improvement image with textual strings and using a system configured to recognize textual strings, to understand the information, and to determine the appropriate translation, rotation angle, and scale factor of the improvement image to render a geographically referenced image.

16 Claims, 4 Drawing Sheets

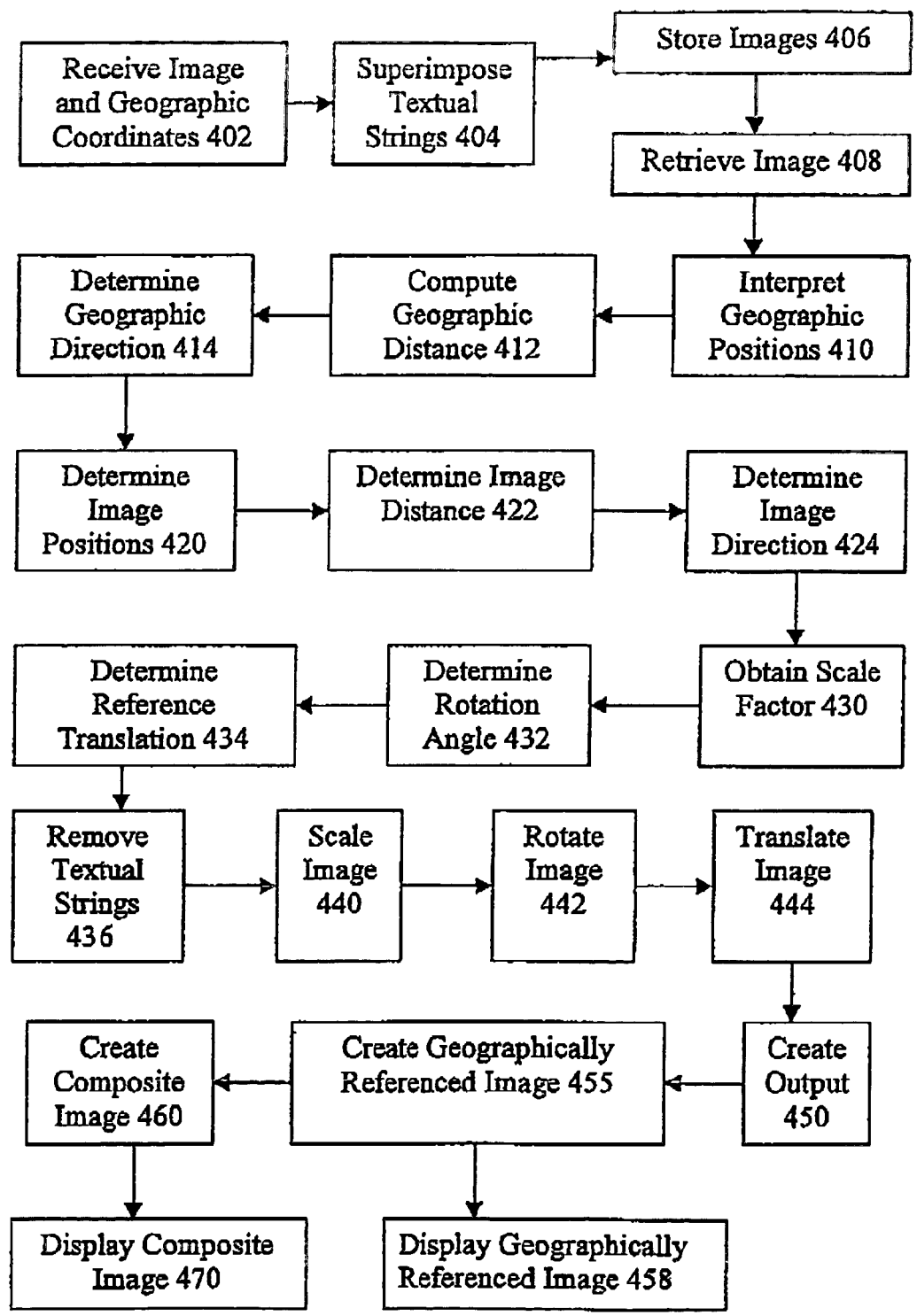

SYSTEM AND METHOD FOR GEOGRAPHICALLY REFERENCING AN IMPROVEMENT IMAGE

BACKGROUND OF THE INVENTION

In today's world, vehicles such as aircraft, and increasingly, automobiles, rely upon automated and semi-automated systems to aid in their dynamic control. Such systems often comprise means for determining vehicle static and/or dynamic information including vehicle position, velocity, acceleration, and orientation. These systems may use the acquired vehicle information to control the vehicle as it traverses its desired path and/or may communicate the information to a vehicle controller, which may include a driver or pilot or some other participant, to aid in the control of the vehicle.

A variety of means are currently available for determining a vehicle's position relative to a known reference position, such as that of an orbiting satellite, or of a radar installation, or the like. Further, it should be noted that a vehicle's position, once determined, may be expressed as a translation from the reference position. In addition, the vehicle's position relative to other reference positions (i.e., in terms of other frames of reference) may be determined from such position information so long as the positions of the reference positions (i.e., reference frames) relative to each other are known. This may be accomplished by merely translating the frame of reference from that of the initial reference position to that of the alternative reference position. For example, a vehicle's position may be expressed relative to a geographic reference position (i.e., in terms of a geographic reference frame) once its position relative to a satellite, whose position relative to the earth, has been determined. As a result, the position of a vehicle may be geographically referenced by describing its distance and direction from a known geographic reference position. For example, a vehicle's position on the surface of the earth may be described by its latitude and longitude.

In their initial and still common usage, controllers of vehicles would use maps by correlating the positions of their vehicle to the map frame of reference by comparing visible features proximate their vehicles to features depicted on their maps. With the advent of automated control systems and automated means for determining a vehicle's position, however, the speed and accuracy of this process has been vastly improved. These improvements, and the use of automatic and semi-automatic vehicle control, have been made possible by the geographic referencing of maps. It should be noted that if the position of a vehicle is known relative to a geographic reference, then its position may also be correlated to any geographically referenced map or any other geographically referenced information. Moreover, the vehicle's position may then be determined relative to any other point depicted on the geographically referenced map or to any other feature referenced to the map, and thus to the earth.

Depending on the accuracy required for the particular application, maps have approximated the surface of the earth as a two-dimensional plane (ignoring the curvature of the earth), as a 3-dimensional sphere (ignoring differences in elevation/terrain), and as a 3-dimensional body (accounting for variations in elevation/terrain). To further enhance the utility of earth maps in the current age of automated control, and to accommodate the changes that are continually being made to the infrastructure that may be depicted on the maps, such as airports, roadways, bridges, exchanges and legislated restrictions such as one-way traffic regulations, great efforts have been, and continue to be, undertaken to update and improve the detail and accuracy of maps.

Unfortunately, however, the utility of this information is limited by the accuracy and extent to which features are depicted on a particular map or are otherwise commonly referenced. As a result of the proliferation of Computer Aided Design and/or Drafting (CAD) and other uses of computers to aid in the design and depiction of structures (i.e., buildings, roads, airports and other improvements fixedly located on the earth's landscape), extensive libraries of improvement images (i.e., computer line drawings) are currently available for enhancing the features that may be depicted on maps or otherwise correlated with maps and ultimately with vehicle position information. It should be noted that the term improvement image, as used herein, refers to a drawing (such as, for example, a scale drawing) that depicts an improvement or other structure whose position is reasonably fixed with respect to the earth. Such images are commonly produced or used by computers to depict improvements and/or developments such as buildings, bridges and roads. In addition, sufficient information is typically known, or may easily be acquired, to determine the geographic positions of various features of the improvements that are depicted in the image and thus may be utilized as predetermined reference points.

For example, improvement images have been used extensively to depict airport runway configurations. As a result, a comprehensive supply of improvement images currently exists depicting most of the world's airports. Further, hard copies of drawings that were produced prior to the development of CAD systems and that depict relevant improvements may be easily scanned to generate additional improvement images. In the case of airports, improvement images have been produced to depict airport structures such as runways and taxiways, as well as parking, terminal and gate areas. Although these improvement images are often relatively simple, they offer great utility to pilots for manual control of the aircraft while taxiing on airport ground movement surfaces. The scope of the instant invention, however, should not be construed to be limited to airport facilities. For example, it is contemplated that improvement images such as those archived at the building and zoning departments of most local, state or federal government offices could be employed in accordance with the instant invention.

Improvement images exist in a variety of scales and formats, but are often not sufficiently geographically referenced to facilitate their correlation and/or combination with other available information. Thus, some types of improvement images often lack sufficient specific geographic registration information to enable them to be efficiently correlated, and/or manipulated for correlation, with relevant geographically referenced map images. Further, although their use in conjunction with automated aircraft control systems offers great benefits, many available improvement images are not easily or reliably projected onto computer screens for use by current aircraft navigation systems. Moreover, this lack of sufficient referencing information prevents the improvement images from being reliably or accurately re-oriented (i.e., scaled, rotated, and translated) for combination with other geographically referenced images such as maps depicting all or portions of the earth. As a result, many improvement images cannot easily be used in their current form to determine a vehicle's position relative to a depicted feature. Further, current methods for converting improvement images, such as airport map line drawings, involve laborious and time consuming hand processing that is prone to error.

SUMMARY OF THE INVENTION

The instant invention provides a system and method for converting improvement images to geographically referenced chart symbols and for combining improvement images with other geographically referenced information. In addition, the instant invention enables the automated correlation of improvement images with other geographically referenced information such as maps of the earth or regions of the earth. Further, the instant invention also provides a system and method that extends the comparison of vehicle position information to all the additional structures depicted in any available improvement images.

The instant invention provides for the addition of essential data to improvement images to facilitate reliable, accurate and automatic adaptation of the improvement image for combination with other geographically referenced images. This may comprise, for example, marking specific reference points on the improvement image with textual strings and typically involves recognizing the textual string, interpreting the information in the string, and/or determining the appropriate translation, rotation, and scaling of the improvement image to render a geographically referenced image.

BRIEF DESCRIPTION OF THE DRAWINGS

The above-mentioned objects and features of the present invention can be more clearly understood from the following detailed description considered in conjunction with the following drawings, in which:

FIG. 4 depicts an exemplary process flow according to one aspect of the instant invention.

DETAILED DESCRIPTION

The instant invention provides a system and a process and/or method by which an improvement image, such as a computer line drawing, with embedded points marked with textual strings can be automatically scaled, rotated, and translated so that the improvement image may be geographically referenced and may be combined with other geographically referenced information to form a geographically referenced composite image.

Figure 1:
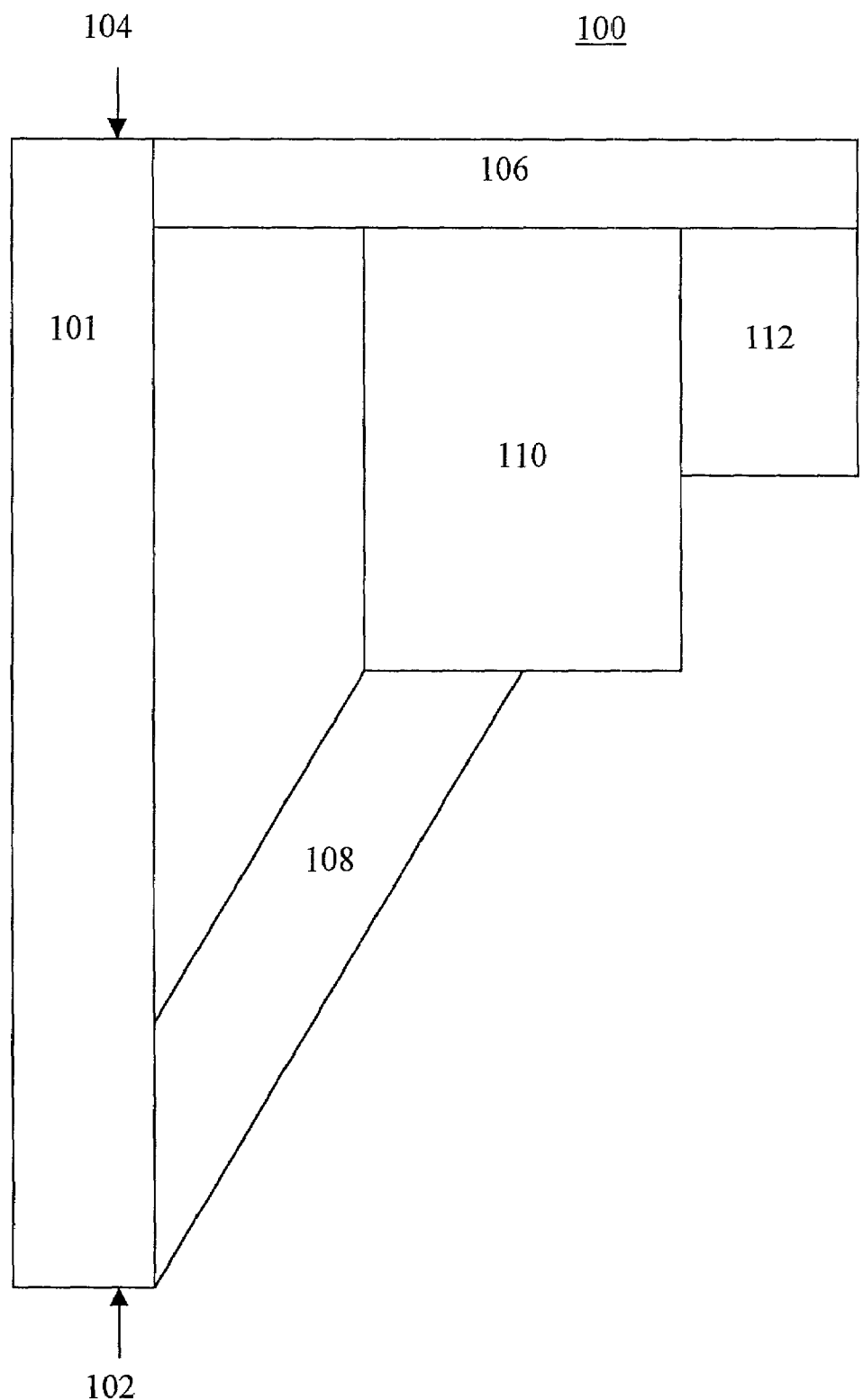
FIG. 1 is an exemplary improvement image depicting an airport.

In accordance with an exemplary embodiment of the instant invention, FIG. 1 illustrates an improvement image 100 such as that which may be supplied to the system of the instant invention. In this case, improvement image 100 depicts elements of an airport including a runway 101 that has a beginning, depicted as first reference point 102, and an end, depicted as second reference point 104. Adjacent to runway 101 are taxiways 106, 108, parking area 110, and hanger area 112. Thus, in this case, improvement image 100 is a scale drawing of a plan view of the airport improvements. Further, it should be noted that in this case, the end points of runway 101 were chosen as reference points because the geographic positions (i.e., latitude and longitude) of the features they depict (i.e., the runway endpoints) are known. Put another way, reference points 102 and 104 depict geographically referenced features known to those of skill in the art.

It should be noted that, although not currently imbedded in improvement image 100, this geographic reference information is nevertheless known and is available to the system for use in geographically referencing improvement image 100. Accordingly, for illustration purposes, the geographic position of the feature corresponding to point 104 on improvement image 100 is North 35:56.57 latitude and West 112:09.41 longitude. Similarly, the geographic position of the feature corresponding to point 102 on improvement image 100 is North 35:57.70 latitude and West 112:08 longitude.

Figure 2:
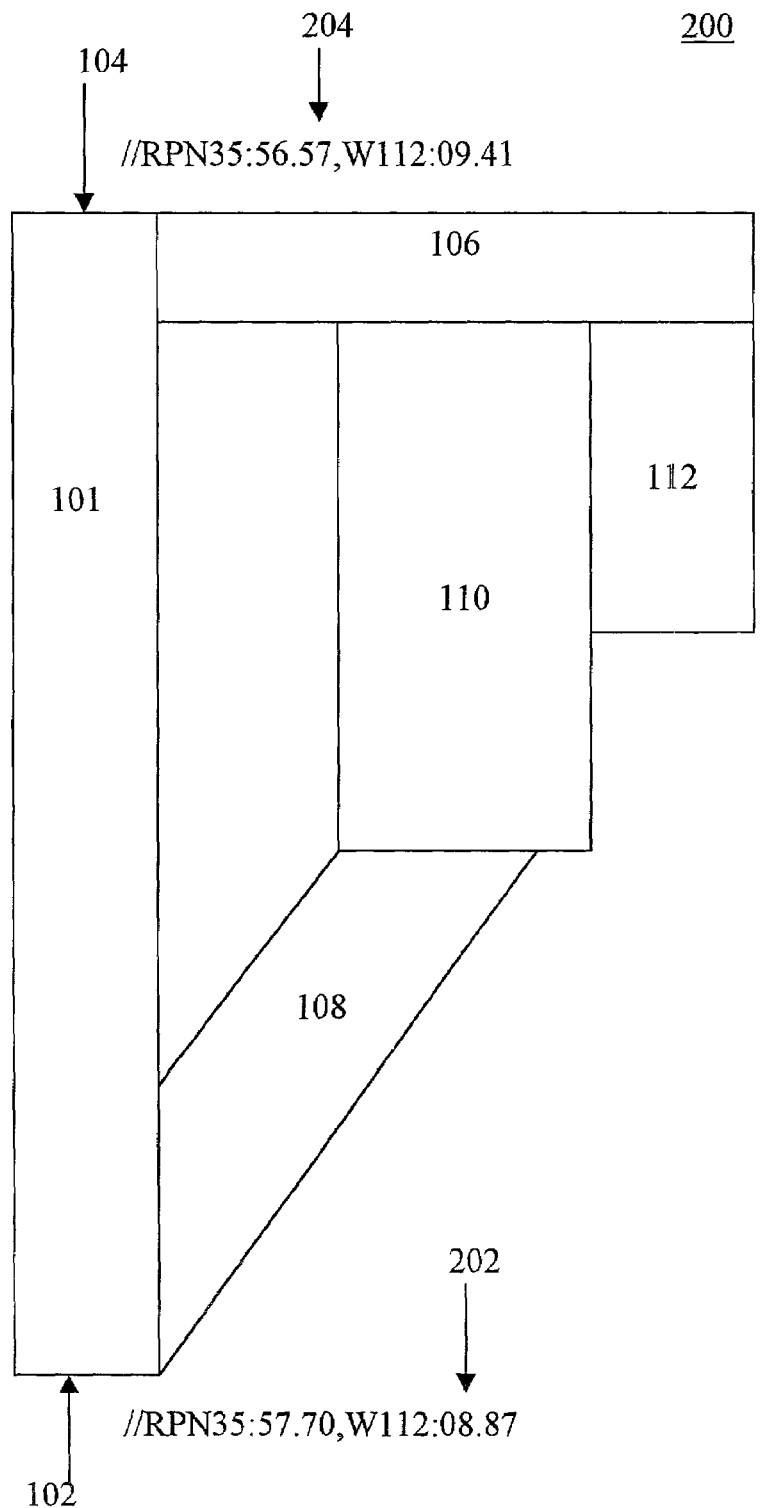
FIG. 2 is an exemplary improvement image modified in accordance with an exemplary embodiment of the instant invention.

FIG. 2, then, depicts a modified improvement image 200 in accordance with an exemplary embodiment of the instant invention. As shown in FIG. 2, textual strings 202, 204 are superimposed on modified improvement image 200 to indicate the geographic positions of the features depicted by image reference points 102, 104, those features being the ends of runway 101. It should be noted that the superimposition of the textual strings onto the improvement image may be accomplished using a variety of CAD systems such as ADOBE Acrobat, CATIA, AutoCAD, CAD-3D, Turbo-CAD, and the like.

In this exemplary embodiment, the points are marked with textual strings 202, 204 that are flagged with predetermined tokens recognized by the system. The textual string "RP" has been chosen as the flag or token, the character "N," has been chosen to indicate north, the character "W" has been chosen to indicate west, and the format "xxx:xx.xx" has been chosen to indicate the angular orientation. In accordance with this exemplary embodiment, the system may be configured to recognize strings beginning with the unique sub-string "//RP" as a flag indicating that what follows is a geographic reference ("R") latitude and longitude pair ("P"). In addition, the system may be configured to recognize the chosen format and/or syntax, to understand that the information provides the image position of a reference point as well as the geographic position of the depicted feature, and to treat the information accordingly.

It should be noted that a variety of formats and/or syntax selections for the strings and tokens may be used to communicate the necessary information, and all such choices of format and/or syntax are considered to be within the scope of this invention. It should also be noted that a minimum of two reference points (or alternatively, a single reference point coupled with a scale factor and an orientation) are required to sufficiently describe the geographic frame of reference of an improvement image. Additional information, though redundant, could be employed to enable cross-checking and/or improve accuracy or reliability. To improve accuracy, it is preferable to locate the reference points as far apart as practical.

Accordingly, textual strings 202, 204 are superimposed on modified improvement image 200 such that they define the positions on modified improvement image 200 corresponding to reference features whose geographic positions are known. For example, the starting position of textual strings 202, 204 may be predetermined to coincide, in a known manner, with reference points 102, 104. As a further example, textual strings 202, 204 may include a predetermined character, such as a leading or trailing or imbedded period, whose position on modified improvement image 200 is prescribed to correspond in a known manner to reference points 102, 104. The reference points, then, may be used to translate an image's original frame of reference to any other desired frame of reference.

It is of no consequence that the strings obscure other information on modified improvement image 200 because textual strings 202, 204 may not necessarily be rendered if and when the remainder of an improvement image is combined with additional geographically referenced information such as another map image. Further, as discussed above, the system may be configured to automatically remove the strings from modified improvement image 200 before combining it with other commonly referenced information.

Figure 3:
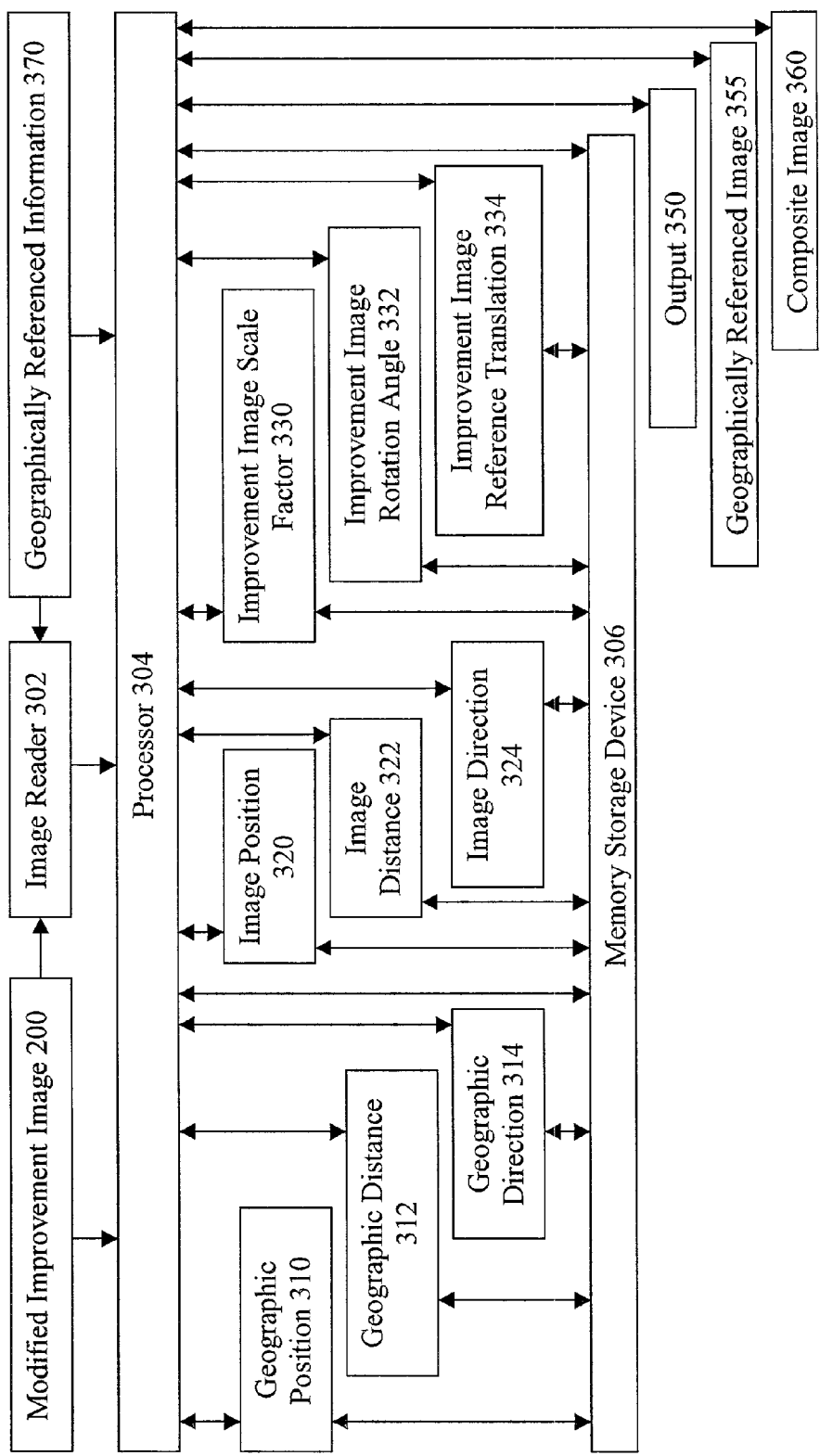
FIG. 3 is an exemplary system for processing an improvement image as well as other geographically referenced information to produce a composite image in accordance with one aspect of the instant invention.

FIG. 3 is an exemplary system for processing modified improvement image 200 as well as other geographically referenced information 370 to produce a composite image 360. As shown in FIG. 3, processor 304 receives modified improvement image 200, either directly or optionally through image reader 302. Processor 304 may also receive other geographically referenced information 370, which may have also passed through image reader 302.

Processor 304, then, communicates with memory storage device 306 to determine geographic positions 310, geographic distance 312, and geographic direction 314 of the features corresponding to reference points 102, 104. In addition, processor 304 communicates with memory storage device 306 to determine image positions 320, image distance 322, and image direction 324 based on reference points 102, 104. Then, processor 304 communicates with memory storage device 306 to determine improvement image scale factor 330, improvement image rotation angle 332, and improvement image reference translation 334. Finally, processor 304 may write output 350, geographically referenced image 355, and/or composite image 360.

The present invention is described herein in terms of functional block components, optional selections and various processing steps. It should be noted that these functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as Fortran, C, C++, Java, XML, COBOL, assembler, PERL, Basic, Matlab or the like, with the various algorithms being implemented with any combination of data structures, objects, processes, routines or other programming elements. Further, it should be noted that the present invention may employ any number of conventional techniques for data transmission, signaling, data processing, network control, and the like.

It should also be noted that many applications of the present invention could be formulated. It should further be noted that the present invention may be embodied as a method, a data processing system, a device for processing data, a device for processing and/or displaying images, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like. Any suitable image display device may be employed such as a video monitor, CRT, liquid crystal display, LED, thin screen monitor, plasma display, printer or any other device for displaying information.

FIG. 4 depicts an exemplary process flow of the method of the instant invention. As shown in FIG. 4, the system receives improvement image 100 as well as information sufficient to specify geographic positions 310 of features depicted on the image (step 402). Next, the system modifies improvement image 100 by superimposing textual strings 202, 204 upon it so as to denote geographic positions 310 as well as the image position 320 of a set of predetermined reference points (step 404). Textual strings 202, 204 may be configured to include a flag or similar token that may be known to the system to (i) indicate that the string describes geographic positions 310 of the features depicted by the reference points, (ii) convey information denoting the image position 320 of the reference points, and (iii) convey information denoting geographic position 310 of the features depicted by the reference points. At this point, the system may optionally store the modified improvement image for future use (step 406). In any event, the system then retrieves a desired modified improvement image 200 and scans it to identify and locate textual strings 202, 204 signaling reference points 102, 104 (step 408). It should be noted that this step of scanning the image comprises locating and extracting appropriate information. Scanning may be accomplished by visually or optically searching for the conforming flag or token or through electronic means commonly implemented in text editors for locating specific strings or conforming tokens. Once the information has been identified and/or located, the information it contains may be extracted. This may be accomplished by duplicating the string to be saved for later use or by interpreting the string to derive an save the desired information.

Once the desired modified improvement image 200 has been obtained as described above, it may be processed to enable it to be combined with other geographically referenced information 370. This may be accomplished by determining to what extent modified improvement image 200 must be scaled, rotated, and/or translated in order to produce a geographically referenced image 355 that may be accurately combined with other geographically referenced information 370 such as maps of the earth. To determine this information requires knowledge of the positions of the reference points in the frame of reference of modified improvement image 200 (i.e., position on modified improvement image 200) as well as in geographic frame of reference (i.e., latitude and longitude of the depicted features).

Accordingly, the system then interprets the image positions 320 of the reference points (step 420) as well as geographic positions 310 of the features they depict (step 410). This may be accomplished by noting the lateral and vertical displacements on modified image 200 and by interpreting the strings specifying geographic positions 310 of the features depicted by the reference points. In addition, the positions and characteristics of textual strings 202, 204 within modified improvement image 200 may be noted. These characteristics may include the size, font, color and angle of textual strings 202, 204.

Then, the system may determine image distance 322 between the points (step 422) as well as the geographic distance 312 between the corresponding features (step 412). For example, the geographic distance 312 between a first point having position Latitude1, Longitude1 and a second point having position Latitude2, Longitude2 may be determined (step 412) according to the following exemplary relationship:

$$\text{Distance in nautical miles} = 60 * \arccos[\sin(\text{Latitude1}) * \sin(\text{Latitude2}) + \cos(\text{Latitude1}) * \cos(\text{Latitude2}) * \cos(\text{Longitude1} - \text{Longitude2})].$$

Similarly, image distance 322 between the reference points may be determined (step 422) according to the following exemplary relationship:

$$D1 = \text{square root}((RP1X - RP2X) + (RP1Y - RP2Y)),$$

where:
  D1 is the distance in the improvement image units, from a first reference point, RP1, to a second reference point, RP2;
  RP1X is the x position of the first reference point on modified improvement image 200;
  RP1Y is the y position of the first reference point on modified improvement image 200;
  RP2X is the x position of the second reference point on modified improvement image 200; and
  RP2Y is the y position of the second reference point on modified improvement image 200.

Next, the system may determine image direction 324, which is the direction of a vector extending from one of the reference points to another in the image reference frame (step 424). This may be expressed as the angle through which a vector pointing in a reference direction such as north must be rotated to reach the direction of image direction 324, and may be determined (step 424) in accordance with the following exemplary relationship:

$$C = \cos^{-1}(\sin(RP2\text{Lat}) - \sin(RP1\text{Lat}) \times \cos(D)/(\sin(D) \times \cos(RP1\text{Lat})),$$

where:
  C is image direction 324.

Alternatively, image direction 324 between the first reference point and the second reference point may be determined (step 424) in accordance with the following exemplary relationships:

If $RP1Y - RP2Y$ is not zero, then:

$C1 = \tan^{-1}((RP1X - RP2X)/(RP1Y - RP2Y));$

But If $RP1Y - RP2Y$ is zero and $RP2X$ is greater than $RP1X$, then:

$C1 = 0;$

Or If $RP1Y - RP2Y$ is zero and $RP2X$ is less than $RP1X$, then:

$C1 = 180;$ where:
  C1 is image direction 324.

Then, the geographic direction 314 from the feature depicted by the first reference point having position Latitude1, Longitude1 and the feature depicted by the second reference point having position Latitude2, Longitude2 may be determined (step 414) in accordance with the following exemplary relationship:

$$\text{Direction} = \arccos[(\sin(\text{Latitude2}) * \sin(\text{Latitude1}) * \cos(\text{Distance}/60))/(\sin(\text{Distance}/60) * \cos(\text{Latitude1}))].$$

Next, improvement image scale factor 330 may be determined (step 430) in accordance with the following exemplary relationship:

$$SF = 60 \times (D1/D),$$

where:
  SF is scale factor 330 in improvement image units per degree of latitude.

Then, the rotation angle 332 may be determined (step 432) in accordance with the following exemplary relationship:

$$RE = C - C1,$$

where:
  RE is the improvement image rotation angle 332.

Then, the reference translation 334, which represents the difference between the position of a reference point on modified improvement image 200 and the position of the corresponding feature in the geographic frame of reference, may be determined (step 434). This may be accomplished based upon the geographic position 310 of any point on modified improvement image 200.

For example, the latitude of any $X_n$, $Y_n$ point on modified improvement image 200 may be determined in accordance with the following exemplary relationship:

$$\text{Lat}_n = (\sin(RE) \times (X_n - RP1X) - \cos(RE) \times (Y_n - RP1Y))/SF + RP1\text{Lat},$$

where:
  $\text{Lat}_n$ is the latitude of the nth reference point, and
  $X_n$ and $Y_n$ define the improvement image position 320.

Similarly, the longitude of any $X_n$, $Y_n$ point on modified improvement image 200 may be determined in accordance with the following exemplary relationship:

$$\text{Lon}_n = (\cos(RE) \times (X_n - RP1X) + \sin(RE) \times (Y_n - RP1Y))/(SF \times \cos(\text{Lat}_n)) + RP1\text{Lon},$$

where:
  $\text{Lon}_n$ is the longitude of the nth reference point.

Once these quantities have been determined, modified improvement image 200 may be scaled by scale factor 330 as determined herein (step 440), rotated to compensate for the rotation angle 332 as determined herein (step 442), and translated according to the reference translation 334 (step 444). It should be noted that the exemplary relationships described above are presented for illustrative purposes only and may be modified using well known mathematical principles without deviating from the scope of this invention.

At this point, modified improvement image 200 may be expressed as a geographically referenced image 355 (step 455), which may be displayed (step 458) and which may be combined with other geographically referenced information 370 to produce composite image 360 (step 460). It may also be useful, however, to create and store output 350 containing the input information such as improvement image 100, in addition to all intermediate information such as positions 310 and 320, distances 312 and 322, and directions 314 and 324, in both image and geographic reference frames as well as scale factor 330, rotation angle 332, and reference translation 334 for the image. Further, it may be useful to determine the rotation angle 332 and geographic position 310 of textual strings 202, 204, saving this information, as well as the characteristics of textual strings 202, 204, to output 350 as well (step 450). Output 350 may then be used to produce composite image 360 comprising improvement image 100 as well as other geographically referenced information 370 (step 460). Finally, composite image 360 may be displayed to the vehicle controller or may otherwise be used to aid in the control of vehicles (step 470). In conjunction with these steps, textual strings 202, 204 may be overlaid upon composite image 360 in any desired orientation, such as an upright orientation, although the image may be in any orientation.

It should be appreciated that the particular implementations shown and described herein are illustrative of the invention and its best mode, and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical image conversion system. As discussed above, the instant invention contemplates displaying and/or communicating the resulting information, image, geographically referenced image, composite image, and/or any other information used or produced in accordance with the instant invention through any appropriate display and/or communication device, which, for the sake of brevity, shall not be more fully described herein.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be noted that the systems and methods of the instant invention may be implemented using other configurations than those shown and discussed above. While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. All such modifications are within the scope of the present invention, which is limited only by the claims which follow.

What is claimed is:

1. A method for geographically referencing an improvement image comprising the steps of:
   superimposing position data upon the improvement image, the superimposed position data denoting geographic positions and image positions of at least two image reference points that depict features,
   extracting the superimposed position data of the at least two image reference points,
   interpreting geographic positions for the features based on the extracted superimposed position data,
   computing a geographic distance between the features,
   determining a geographic direction between the features,
   interpreting image positions for the features based on the extracted superimposed position data,
   computing an image distance between the features,
   determining an image direction between the features, and
   determining an improvement image scale factor based on the computed geographic distance between the features and the computed image distance between the features.

2. The method of claim 1, further comprising the step of displaying said improvement image.

3. The method of claim 1, further comprising the step of determining an improvement image reference translation.

4. The method of claim 3, further comprising the step of translating the improvement image in accordance with the reference translation.

5. The method of claim 1, further comprising the step of determining an improvement image rotation angle.

6. The method of claim 5, further comprising the step of rotating the improvement image in an amount sufficient to compensate for the rotation angle.

7. The method of claim 1, further comprising the step of expressing the geographic positions in latitude and longitude.

8. The method of claim 1, further comprising the step of expressing the geographic distance in nautical miles.

9. The method of claim 1, further comprising the step of scaling the improvement image in an amount sufficient to compensate for the improvement image scale factor.

10. A method for combining an improvement image with geographically referenced information to produce a composite image, the method comprising the steps of:
    superimposing position data upon the improvement image, the superimposed position data denoting geographic positions and image positions of at least two image reference points that depict features,
    extracting the superimposed position data for each of the at least two image reference points,
    interpreting a geographic position for each of the features based on the extracted superimposed position data,
    computing a geographic distance between the features,
    determining a geographic direction between the features,
    interpreting image positions for each of the features based on the extracted superimposed position data,
    computing an image distance between the features,
    determining an image direction between the features, determining an improvement image scale factor based on the computed geographic distance between the features and the computed image distance between the features, determining an improvement image reference translation, determining an improvement image rotation angle, scaling the image based on the determined improvement image scale factor, and creating an output.

11. The method of claim 10, further comprising the step of displaying said composite image.

12. The method of claim 10, the output containing the improvement image reference translation.

13. The method of claim 10, the output containing the improvement image rotation angle.

14. The method of claim 10, further comprising the step of creating a composite image based on said output.

15. A system for geographically referencing an improvement image, the system comprising a memory storage device in communication with a processor, the memory storage device configured to store an improvement image, the processor configured to perform the steps of:

superimposing position data upon the improvement image, the superimposed position data denoting geographic positions and image positions of at least two image reference points that depict features, extracting the superimposed position data for each of the at least two image reference points, interpreting geographic positions for the features based on the extracted superimposed position data, computing a geographic distance between the features, determining a geographic direction between the features, interpreting image positions for the features based on the extracted superimposed position data, computing an image distance between the features, determining an image direction between the features, and determining an improvement image scale factor based on the computed geographic distance between the features and the computed image distance between the features.

16. A system for combining an improvement image with geographically referenced information, the system comprising a memory storage device in communication with a processor, the memory storage device configured to store the improvement image and the geographically referenced information, the processor configured to perform the steps of:

superimposing position data upon the improvement image, the superimposed position data denoting geographic positions and image positions of at least two image reference points that depict features, extracting the superimposed position data for each of the at least two image reference points, interpreting a geographic position for each of the features based on the extracted superimposed position data, computing a geographic distance between the features, determining a geographic direction between the features, interpreting image positions for each of the features based on the extracted superimposed position data, computing an image distance between the features, determining an image direction between the features, determining an improvement image scale factor based on the computed geographic distance between the features and the computed image distance between the features, determining an improvement image reference translation, determining an improvement image rotation angle, scaling the image based on the determined improvement image scale factor, and creating an output.

\* \* \* \* \*